(12) United States Patent
Mainini (10) Patent No.: US 8,947,240 B2
(45) Date of Patent: *Feb. 3, 2015

(54) SYSTEM FOR DETECTING INFORMATION REGARDING AN ANIMAL AND COMMUNICATING THE INFORMATION TO A REMOTE LOCATION

(71) Applicant: Radio Systems Corporation, Knoxville, TN (US)

(72) Inventor: Christopher Mainini, Knoxville, TN (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/804,729

(22) Filed: Mar. 14, 2013

(65) Prior Publication Data

US 2013/0192526 A1 Aug. 1, 2013

Related U.S. Application Data

(63) Continuation-in-part of application No. 11/673,609, filed on Feb. 12, 2007, now Pat. No. 8,436,735.

(51) Int. Cl.
*G08B 23/00* (2006.01)
*A01K 29/00* (2006.01)

(52) U.S. Cl.
USPC .............. 340/573.1; 340/573.3; 119/712; 119/721

(58) Field of Classification Search
USPC ............ 340/573.1, 573.3, 539.11, 539.13; 119/174, 718, 720, 721; 600/300, 309, 600/509; 701/50, 471
See application file for complete search history.

(56) References Cited

U.S. PATENT DOCUMENTS

| | | | | | |
|---|---|---|---|---|---|
| 6,113,539 | A | * | 9/2000 | Ridenour | 600/300 |
| 7,424,867 | B2 | * | 9/2008 | Kates | 119/720 |
| 7,434,541 | B2 | * | 10/2008 | Kates | 119/720 |
| 7,634,975 | B2 | * | 12/2009 | Kates | 119/712 |
| 7,918,185 | B2 | * | 4/2011 | Araki et al. | 119/174 |
| 2006/0155172 | A1 | * | 7/2006 | Rugg | 600/300 |
| 2007/0088194 | A1 | * | 4/2007 | Tahar et al. | 600/102 |
| 2008/0004539 | A1 | * | 1/2008 | Ross | 600/509 |
| 2012/0006282 | A1 | * | 1/2012 | Kates | 119/720 |

* cited by examiner

*Primary Examiner* — Van T. Trieu
(74) *Attorney, Agent, or Firm* — Pitts & Lake, P.C.

(57) ABSTRACT

An animal data communication system, including a rover unit to be carried by an animal, an animal accessory device to interact with the rover unit and/or animal, at least one detector to detect an occurrence of an action engaged in by the animal, and to generate a signal indicative of a detected action, a processing unit to generate animal data identifying the detected action based on the generated signal, and a communication unit disposed on at least one of the rover unit and the animal accessory device to transmit the animal data over a network in response to an occurrence of one or more particular conditions associated with the detected action.

19 Claims, 5 Drawing Sheets

SYSTEM FOR DETECTING INFORMATION REGARDING AN ANIMAL AND COMMUNICATING THE INFORMATION TO A REMOTE LOCATION

CROSS-REFERENCE TO RELATED APPLICATIONS

This application is a continuation-in-part of application Ser. No. 11/673,609 filed on Feb. 12, 2007, now U.S. Pat. No. 8,436,735.

BACKGROUND

1. Field of Invention

The present general inventive concept pertains to a system for communicating current information regarding an animal to a remote user of the system. More particularly, the present general inventive concept pertains to a system for detecting and compiling information indicative of particular conditions and actions of the animal and for communicating the information to a network such that the user can access the information and communicate with the devices that interact with the animal from a remote location.

2. Description of the Related Art

As a result of work, school, and other obligations, most pet owners cannot be with their pet at every moment of every day. However, some pets, due to various conditions, behaviors, and circumstances, require some form of monitoring throughout each day or at least at particular times. Conventional monitoring devices that detect particular conditions and actions of a pet are many and include pet thermometers, heart monitors, and other physiological monitors, bark detecting devices, electronic pet confinement systems, pet repellant devices, and video cameras. However, conventionally, only the results captured by a video camera could be transferred to a remote location, such as the pet owner's place of work or school, where the pet owner could monitor the results. Consequently, conventional pet monitoring devices, except video cameras, are limited in that the results rendered by the devices cannot be perceived at a location remote to the animal. Additionally, video cameras as pet monitoring devices are limited in that they cannot monitor physiological conditions of the pet, and they cannot record and summarily display the frequency and time of certain occurrences, such as barks or breaches of an electronic pet confinement system. Additionally, a video camera's already limited information gathering capabilities are further limited to the field-of-view of its lens. Also, transferring information gathered by a video camera to a remote location, as is typically accomplished by way of the Internet, is a cumbersome task in that the information must either be streamed, which is problematic with certain Internet connections, or the information must be gathered in discrete blocks and transferred, which creates large files to be transferred and downloaded. Consequently, a system that can detect current conditions and actions of the animal, communicate information indicative of the detected conditions and actions to a remote location, and summarily present the information to the system user at the remote location, and to enable the user to communicate with the animal and/or with devices that interact with the animal is desired.

BRIEF SUMMARY

Example embodiments of the present general inventive concept can be achieved by providing an animal data communication system, including a rover unit to be carried by an animal, an animal accessory device to interact with the rover unit and/or animal, at least one detector to detect an occurrence of an action engaged in by the animal, and to generate a signal indicative of a detected action, a processing unit to generate animal data identifying the detected action based on the generated signal, and a communication unit disposed on at least one of the rover unit and the animal accessory device to transmit the animal data over a network in response to an occurrence of one or more particular conditions associated with the detected action.

The animal data communication system can include a remote device operable by a user to communicate with the network and to access the animal data over the network. The remote device and the communication unit can be configured to facilitate two-way communication between the communication unit and the remote device such that the communication unit transmits the animal data over the network only when requested to do so by the remote device.

The remote device can include a control unit to receive control signals from the user, and to transmit the control signals over the network to control at least one of the rover unit and the animal accessory device. The control signals can include a signal to activate and/or deactivate the animal accessory device.

The detector can be disposed on at least one of the rover unit and the animal accessory device to detect actions of the animal, and the communication unit can be disposed on the animal accessory device to transmit the animal data upon the occurrence of the particular condition.

The animal accessory device can be a pet feeding device, and the particular condition can include a measurement of an amount of food contained in the pet feeding device.

The animal accessory device can be a pet watering device, and the particular condition can include a measurement of an amount of water contained in the pet watering device.

The animal accessory device can be a pet door, and the particular condition can include one or more times at which the animal is permitted to enter or exit the pet door.

The rover unit can include a location awareness unit, and the particular condition can include positional information of the animal.

The animal accessory device can include a boundary control unit, and the processing unit can process the positional information relative to a boundary of the boundary control unit.

The animal data communication system can include a plurality of rover units respectively carried by a plurality of animals, and the processor can process the animal data according to the detected action of each animal. In addition, the animal data communication system can include a plurality of animal accessory devices, and the processor can process the animal data according to the detected action of the animal with respect to each animal accessory device.

The animal accessory device can be one or more of an animal boundary control unit, a pet feeding device, a pet watering device, a pet door, a litter box, a pet toy, a pet consumable, and an animal tracking system. The detected action engaged in by the animal can correspond to a particular animal accessory device.

The at least one detector can include one or more of an animal bark sensor, a proximity detector, a fluid level detector, a weight detector, and a camera unit.

Example embodiments of the present general inventive concept can also be achieved by providing an animal data communication system, including a rover unit to be carried by an animal, an animal accessory device to interact with the rover unit and/or animal, at least one detector to detect a physiological condition of the animal and an action engaged in by the animal, and to generate signals indicative of a detected action and a detected physiological condition, a processing unit to generate animal data identifying the detected action and the detected physiological condition based on the generated signals, and a communication unit disposed on at least one of the rover unit and the animal accessory device to transmit the animal data over a network in response to an occurrence of one or more particular conditions associated with the detected action and/or the detected physiological condition.

The animal accessory device can be a pet door, and the pet door can be configured to enable the animal to enter or exit the pet door only upon the occurrence of a particular condition associated with the detected physiological condition of the animal.

The at least one detector can include one or more of an animal bark sensor, a proximity detector, a fluid level detector, a weight detector, a camera unit, and a thermocouple.

Example embodiments of the present general inventive concept can also be achieved by providing an animal data communication system for detecting particular conditions and actions of an animal, compiling information indicative of the detected conditions and actions, communicating the information to a remote location, and presenting the information at the remote location. The animal data communication system includes a carried device and an interfacing device. The carried device is carried by the animal and includes an animal data collecting device and a transmitter. The animal data collecting device detects particular physiological conditions and actions of the animal and compiles animal data, namely information generated from and indicative of the detected physiological conditions and actions of the animal. The animal data collecting device is in electrical communication with the transmitter such that the transmitter receives the animal data from the animal data collecting device and transmits the animal data by way of wireless communication. The interfacing device includes a receiver and a network interface. The receiver is in wireless communication with the transmitter such that the receiver receives the animal data transmitted by the transmitter. The receiver is in electrical communication with the network interface such that the network interface receives the animal data from the receiver and communicates the animal data to a network. When the network interface communicates the animal data to the network, the user of the animal data communication system accesses the network by way of a display device, which is in communication with the network, and perceives the animal data. The display device is disposed at a location remote to the animal such that the user can perceive the animal data at the remote location.

Additional features and embodiments of the present general inventive concept will be set forth in part in the description which follows and, in part, will be obvious from the description, or may be learned by practice of the general inventive concept.

BRIEF DESCRIPTION OF THE SEVERAL VIEWS OF THE DRAWINGS

The above-mentioned features of the present general inventive concept will become more clearly understood from the following detailed description read together with the drawings in which.

DETAILED DESCRIPTION

From the outset, it should be noted that the present general inventive concept may be embodied in many different forms and should not be construed as limited to the specific embodiments described herein. Rather, the specific embodiments described herein are provided to ensure that this detailed description is thorough and complete, and to ensure that the scope and spirit of the present general inventive concept are communicated effectively to those skilled in the art. Accordingly, one embodiment of an animal data communication system for detecting particular conditions and actions of an animal, compiling information indicative of the detected conditions and actions, communicating the information to a remote location, and presenting the information at the remote location and constructed in accordance with the various features of the present general inventive concept is illustrated generally at 10 in FIG. 1. The animal data communication system 10 includes a carried device and an interfacing device. In some embodiments, the carried device is carried by the animal and includes an animal data collecting device and a transmitter. In other embodiments, the data collection, processing, and transmission elements can be disposed on an accessory interactive device.

In some embodiments, the animal data collecting device detects particular physiological conditions and actions of the animal and compiles animal data, namely information generated from and indicative of the detected physiological conditions and actions of the animal. The animal data collecting device is in electrical communication with the transmitter such that the transmitter receives the animal data from the animal data collecting device and transmits the animal data by way of wireless communication. The interfacing device includes a receiver and a network interface. The receiver is in wireless communication with the transmitter such that the receiver receives the animal data transmitted by the transmitter. The receiver is in electrical communication with the network interface such that the network interface receives the animal data from the receiver and communicates the animal data to a network. When the network interface communicates the animal data to the network, the user of the animal data communication system 10 accesses the network by way of a display device, which is in communication with the network, and perceives the animal data. The display device is disposed at a location remote to the animal such that the user can perceive the animal data at the remote location.

Figure 1:
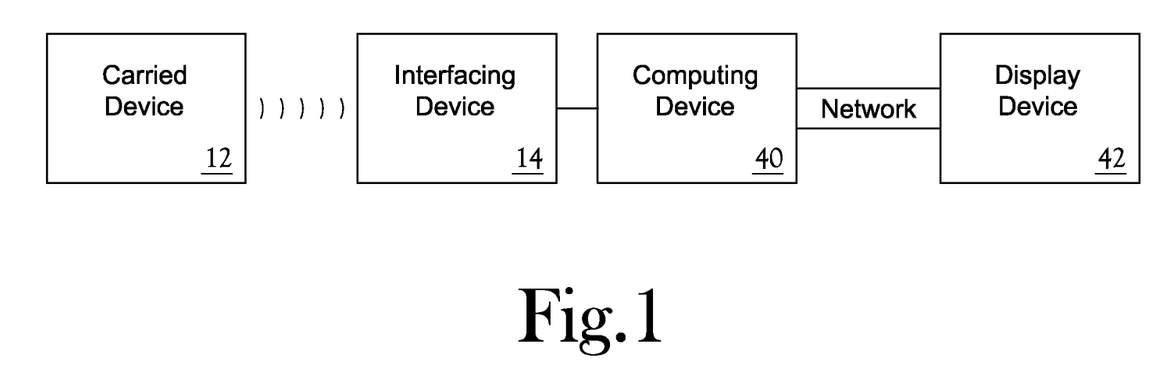
FIG. 1 is a block diagram illustrating one embodiment of the animal data communication system in accordance with the various features of the present present general inventive concept.
Figure 2:
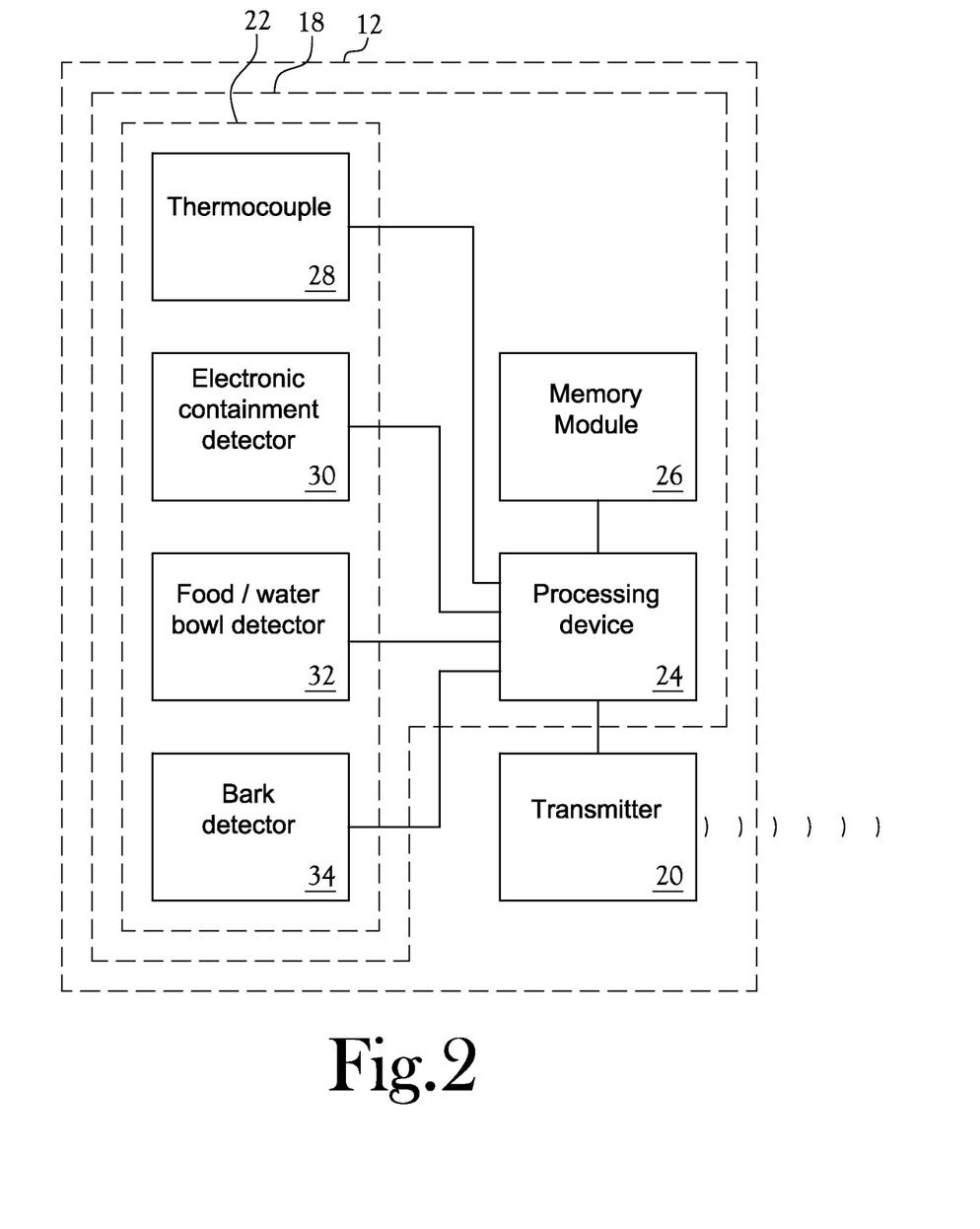
FIG. 2 is a block diagram of the carried device of the animal data communication system.

FIG. 1 is a block diagram illustrating an example embodiment of the animal data communication system 10 in accordance with the various features of the present general inventive concept. In this embodiment, the animal data communication system 10 includes a carried device 12, also referred to herein as a rover unit, and an interfacing device 14. The carried device 12 is carried by an animal. In one embodiment, the carried device 12 is carried by the animal by way of a pet collar. However, the carried device 12 can be carried by the animal by ways other than a pet collar, such as by a harness or clothing, without departing from the scope or spirit of the present general inventive concept. FIG. 2 is a block diagram depicting an example embodiment of the carried device 12 of FIG. 1 in accordance with the various features of the present general inventive concept. In this embodiment, the carried device 12 includes an animal data collecting device 18 and a transmitter 20. However, the present general inventive concept is not limited to locating the animal collecting device 18 and/or transmitter 20 on the carried device 12. As described in further detail with reference to FIG. 4, it is possible to locate a processing unit 24 and communication unit 20' on an accessory interactive device 120 (i.e., pet article) to facilitate processing and transmission from the interactive device 120.

The animal data collecting device 18 detects particular physiological conditions and actions of the animal and generates electrical signals indicative of the detected conditions and actions, processes the electrical signals to generate animal data, compiles the animal data, and stores the animal data. More specifically, the animal data collecting device 18 can include at least one detector 22, a processing device 24, and a memory module 26. The at least one detector 22 detects particular physiological conditions and actions of the animal. The particular conditions and actions detected by the at least one detector 22 are governed by the particular detectors utilized as the at least one detector 22. In FIG. 2, the at least one detector 22 includes a thermocouple 28, an electronic containment detector 30, a food/water bowl detector 32, and a bark detector 34. The thermocouple 28 detects the body temperature of the animal. For example, if the temperature of the animal reaches a predetermined level, the transmitter 20 will transmit the associated animal data over the network to the remote user. It is noted that the communication unit 20' of the present general inventive concept is not limited to any particular type of receiver, transceiver, transmitter element, or communication protocol to facilitate transmission and receipt of data over a network and/or between the respective carried, interactive, and remote devices, and those skilled in the art will appreciate that various known or later developed types of communication units can be chosen with sound engineering judgment to carry out the features of the present general inventive concept, including various Wi-Fi, Bluetooth®, or any other suitable long-range or short-range communication technology, without departing from the scope or spirit of the present general inventive concept.

The electronic containment detector 30 can also be responsive to an accessory device such as an electronic pet containment system such that the electronic containment detector 30 detects a location of the animal, for example, to determine when the animal approaches the perimeter, or boundary, defined by the electronic pet containment system. In some embodiments, the carried device 12 (i.e., rover unit) may include a location awareness unit 30' to determine positional information of the animal. The location awareness unit 30' can be a global positioning system (GPS) device, a global navigation satellite system (GNSS) device, or various other types of location awareness systems, which may be collectively referred to herein as GPS-type systems. Those skilled in the art will appreciate that conventional GPS-type location awareness systems operate under principles of triangulation and/or trilateralization to determine location information of mobile subjects relative to fixed positions. The methods of operation of GPS-type systems are well-known and can be used to determine the location of animals relative to a pet article such as a boundary control system or other animal tracking device. In some embodiments of the present general inventive concept, it is possible to implement a GPS-type location awareness unit such that the particular condition triggering the communication of animal data over the network is based on the location of the animal as determined by the location awareness unit disposed on the rover unit 12 carried by the animal. For example, the location awareness unit 30' can process the positional information relative to a respective boundary of an interactive boundary control unit such that the particular condition is based on a location of the animal relative to a boundary defined by the boundary control unit.

Referring to FIG. 2, the food/water bowl detector 32 can be responsive to a signal transmitting device disposed within the animal's food/water bowl such that the food/water bowl detector 32 detects when the animal approaches the food/water bowl. In some embodiments, it is possible for the particular condition to be associated with an amount of food/water in the food/water bowl to determine whether a particular animal which has approached the food/water bowl has consumed certain amount of food/water. And the bark detector 34 detects when the animal barks. It should be noted that the at least one detector 22 can include detectors other than the detectors of the illustrated embodiment without departing from the scope or spirit of the present general inventive concept. For example, the at least one detector 22 can include one or more detectors, such as level detectors, weight detectors, proximity detectors, and the like, to determine whether an animal has used a litter box, consumed a pet consumable, played with a pet toy, entered/exited a pet door, moved about a camera field of view, or engaged in various other activities. The particular conditions can be selectively controlled and defined by a user using a remote device, enabling the particular conditions to be defined by a desired level or type of activity. Once the desired condition has been satisfied, and/or upon the request of the user, the system can be enabled to transmit the animal data over the network. Additionally, the at least one detector 22 can be a single detector without departing from the scope or spirit of the present general inventive concept.

Since the processing device 24 can be located on the carried device 12 and/or on one or more of the accessory interactive devices (120 in FIG. 4), embodiments of the present general inventive concept can provide a 'smart' collar device to facilitate the detection, processing, and transmission of the animal data, and/or a 'smart' accessory device to facilitate the detection, processing, and transmission of the animal data. It is not necessary that both devices be 'smart' devices, but it will be appreciated that various combinations and sub-combinations of elements can be disposed on one or both of the devices 12, 120 such that each device handles all or some portion of the detection, collection, processing, and transmission of data for the overall communication system.

In some embodiments, the processing device 24 is in electrical communication with the at least one detector 22 and in electrical communication with the memory module 26, but the present general inventive concept is not limited to any particular arrangement or components. As a detector of the at least one detector 22 that detects a particular physiological condition of the animal detects the particular condition, it generates an electrical signal that is indicative of the detected condition. More specifically, as in the illustrated embodiment, when the thermocouple 28 detects the body temperature of the animal, it generates an electrical signal that indicates the body temperature of the animal. Additionally, when a detector of the at least one detector 22 that detects a particular action of the animal detects the particular action, it generates an electrical signal that is indicative of the detected action. More specifically, as in the illustrated embodiment, when the electronic containment detector 30, the food/water bowl detector 32, or the bark detector 34 detect the animal approach the perimeter defined by the electronic pet containment system, approach its food/water bowl, or bark, respectively, the detector generates an electrical signal that indicates the detected action. The electrical signals that are generated by the at least one detector 22 are received by the processing device 24. Because a physiological condition of an animal, such as the body temperature of the animal, is a continuous occurrence, unlike a particular action, which is a discrete occurrence, the processing device 24 receives the electrical signal generated by a detector that detects a physiological condition only upon being induced to do so. More specifically, as in the illustrated embodiment, the processing device 24 includes an internal clock. The internal clock induces the processing device 24 to receive the electrical signal generated by, for example, the thermocouple 28 on a periodic schedule. It should be noted that the processing device 24 can be induced to receive the electrical signal generated by a detector of the at least one detector 22 that detects a physiological condition of the animal by other occurrences, such as a change in the generated electrical signal or a request by the user, as subsequently discussed, without departing from the scope or spirit of the present general inventive concept. It should also be noted that the processing device 24 can continuously receive the signal generated by the at least one detector 22 without departing from the scope or spirit of the present general inventive concept. Additionally, in the illustrated embodiment, when the processing device 24 receives an electrical signal generated by the at least one detector 22, the processing device 24 time stamps the electrical signal such that the time at which the at least one detector 22 detected a particular condition or activity is recorded. The time stamping is facilitated by the internal clock of the processing device 24.

The processing device 24 processes the electrical signals generated by the at least one detector 22 to generate animal data, which is formatted to be suitable for compiling, storing, and computing. In other words, the animal data is the electrical signals generated by the at least one detector 22, which are indicative of the detected physiological conditions and actions of the animal, in a manageable format. The processing device 24 compiles the animal data, including respective time stamps, and transfers the animal data to the memory module 26, which stores the animal data. The processing device 24 is in electrical communication with the transmitter 20. The processing device 24 transfers the animal data from the memory module 26 to the transmitter 20 when induced to do so. In the illustrated embodiment, the internal clock of the processing device 24 induces the processing device 24 to transfer the animal data to the transmitter 20 on a periodic schedule. It should be noted that the processing device 24 can be induced to transfer the animal data to the transmitter 20 by occurrences other than those presented by the internal clock of the processing device 24, such as the request of the user, as subsequently discussed, without departing from the scope or spirit of the present general inventive concept. When the processing device 24 transfers the animal data from the memory module 26 to the transmitter 20, the transmitter 20 transmits the animal data to the interfacing device 14.

Figure 3:
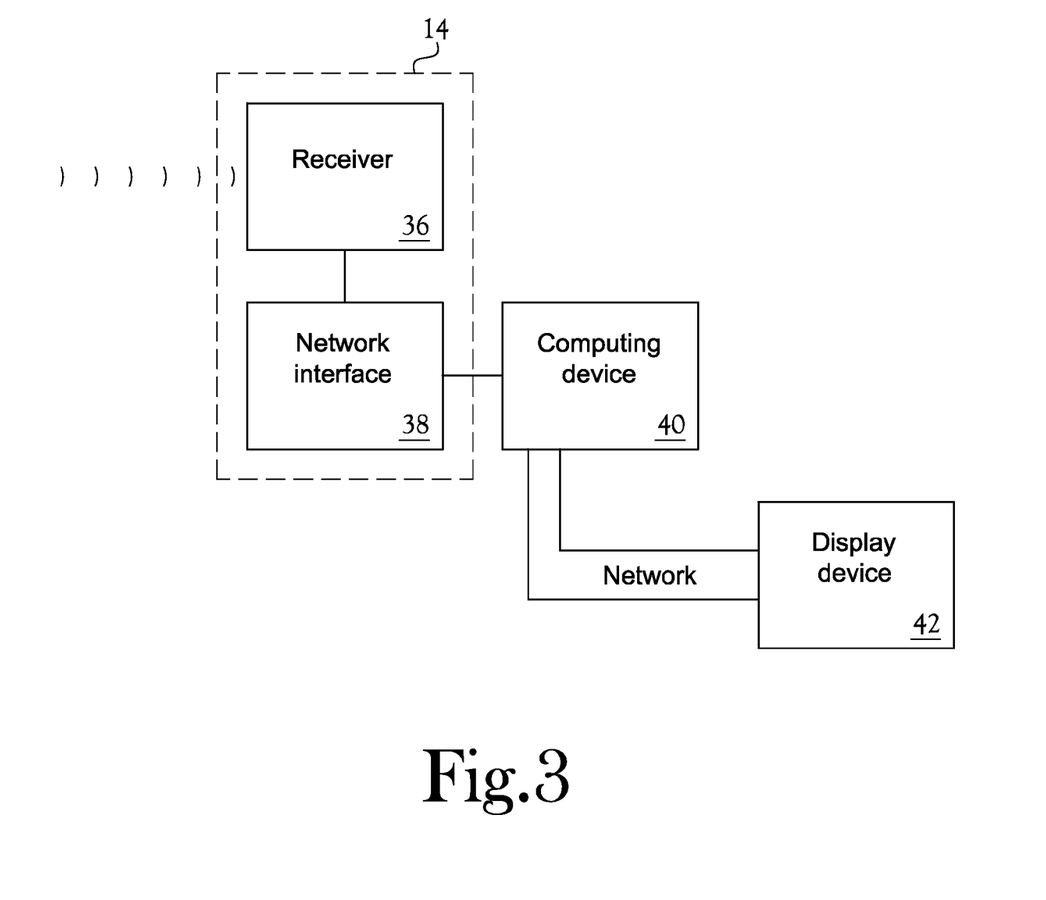
FIG. 3 is a block diagram of the interfacing device of the animal data communication system in communication with various supplementary devices.

FIG. 3 includes a block diagram illustrating an example interfacing device 14 illustrated in FIG. 1 in accordance with various features of the present general inventive concept. In this embodiment, the interfacing device 14 includes a receiver 36 and a network interface 38. The receiver 36 is in communication with the transmitter 20 such that the carried device 12 is in communication with the interfacing device 14, as depicted in FIG. 1. More specifically, the receiver 36 receives the animal data transmitted by the transmitter 20. In the illustrated embodiment, the transmitter 20 transmits the animal data to the receiver 36 by way of wireless communication. It should be noted that the wireless communication between the transmitter 20 and the receiver 36 includes communication accomplished by Wi-Fi, Bluetooth®, or any other long-range or short-range radio technology without departing from the scope or spirit of the present general inventive concept. It should also be noted that the transmitter 20 can transmit the animal data to the receiver 36 by way of wired communication. The receiver 36, which is in electrical communication with the network interface 38, transfers the animal data to the network interface 38. The network interface 38 is in communication with a network. In the illustrated embodiment, the network interface 38 is in communication with a computing device 40, such as a desktop computer, which includes network capabilities. Thus, the network interface 38 is in communication with the network, such as the Internet, by way of the computing device 40. It should be noted that the computing device 40 can be a device having internet capabilities other than a desktop computer without departing from the scope or spirit of the present general inventive concept. It should also be noted that the network interface 38 can establish network communication independently, without doing so by way of another device, such as the computing device 40, without departing from the scope or spirit of the present general inventive concept. Additionally, it should be noted that the network can be a network other than the Internet without departing from the scope or spirit of the present general inventive concept.

The network interface 38 facilitates communication with the computing device 40 by way of an adapter that is compatible with a port comprised by the computing device 40, such as a USB port or a serial port. In the illustrated embodiment, the network interface 38 transfers the animal data to the computing device 40. The computing device 40 is equipped with software for reading the animal data as transferred by the network interface 38. The software tabulates and formats the animal data such that the animal data can be summarily presented. Additionally, the animal data is formatted such that it is capable of being communicated by way of the network. Consequently, after the computing device 40 tabulates and formats the animal data, the computing device 40 communicates the animal data to the network.

The user of the animal data communication system 10 has access to a remote device including a display device 42. The display device 42 is in communication with the network such that the display device 42 receives the tabulated and formatted animal data and presents the animal data such that the user perceives the animal data. The display device 42 can be any device capable of accessing the network and presenting the animal data, such as a desktop computer or a personal digital assistant (PDA), without departing from the scope or spirit of the present general inventive concept. As previously mentioned, in one embodiment, the computing device 40 is Internet capable. Accordingly, in one embodiment of the present general inventive concept, the computing device 40 uploads the tabulated and formatted animal data to a designated Internet webpage, where the animal data is summarily presented.

The user, by way of the display device 42, accesses the designated webpage and views the animal data. In another embodiment of the present general inventive concept, the computing device 40 generates an electronic mail (email) that includes the animal data either in the body of the email or by attachment. The computing device 40 transmits the email by way of the Internet to a designated email account, which is accessible by the user by way of the display device 42. The user accesses the designated email account, opens the email, and views the animal data by way of the display device 42. It should be noted that the animal data can be transmitted by way of the network by ways other than being posted to a webpage or being sent by email without departing from the scope or spirit of the present general inventive concept.

Because the animal data is available to the user by way of the network, the user can access the animal data from locations remote to the animal. Additionally, the animal data provides the user with valuable information such that the user can be away from the animal, such as at work or school, and still monitor the condition and actions of the animal. For example, in the illustrated embodiment, the user is able to monitor whether the animal is getting, losing, or maintaining a fever by viewing various time stamped samples of the animal's body temperature as provided by the thermocouple 28. Additionally, the user is able to monitor the whereabouts of the animal, such as when the animal approaches particular defined perimeters, as provided by the electronic containment detector 30. Additionally, the user is able to determine when the animal eats and drinks by monitoring when the animal approaches its food/water bowl as provided by the food/water bowl detector 32. Finally, the user is able to monitor when, how often, and the duration that the animal barks as provided by the bark detector 34. Further, the bark detector 34 in combination with the electronic containment detector 30 reveals the animal's location when it barks, indicating the source of the animal's agitation. Equipped with the otherwise unavailable information provided by the animal data, the user can adjust his approach to caring for the animal, making for a happier and healthier animal.

One alternate embodiment of the animal data communication system 10 provides for two-way communication between the carried device 12 and the user. More specifically, in the alternate embodiment, the carried device 12 transmits the animal data in response to a request by the remotely located user instead of in response to the periodic schedule maintained by the internal clock of the processing device 24, as provided in some embodiments. In some embodiments, the user can submit a request for the animal data by way of the display device 42. For example, when the animal data is posted to a website, the user selects a "request" link. Alternatively, when the animal data is provided by way of email, the user submits his request by emailing such to a designated account. When the user submits the request for the animal data, the request is communicated to the computing device 40 by way of the network. The computing device 40 formats the request accordingly and transfers it to the network interface 38. The network interface 38 communicates the request to the receiver 36, which in the alternate embodiment is a transceiver, capable of transmitting and receiving signals. The receiver 36 transmits the request to the transmitter 20, which in the alternate embodiment is a transceiver, capable of transmitting and receiving signals. The transmitter 20 receives the request and communicates the request to the processing device 24, inducing the processing device 24 to transfer the animal data from the memory module 26 to the transmitter 20. After the processing device 24 transfers the animal data from the memory module 26 to the transmitter 20, the transmitter 20 transmits the animal data to the receiver 36 in accordance with the previously discussed illustrated embodiment of the animal data communication system 10.

Figure 4:
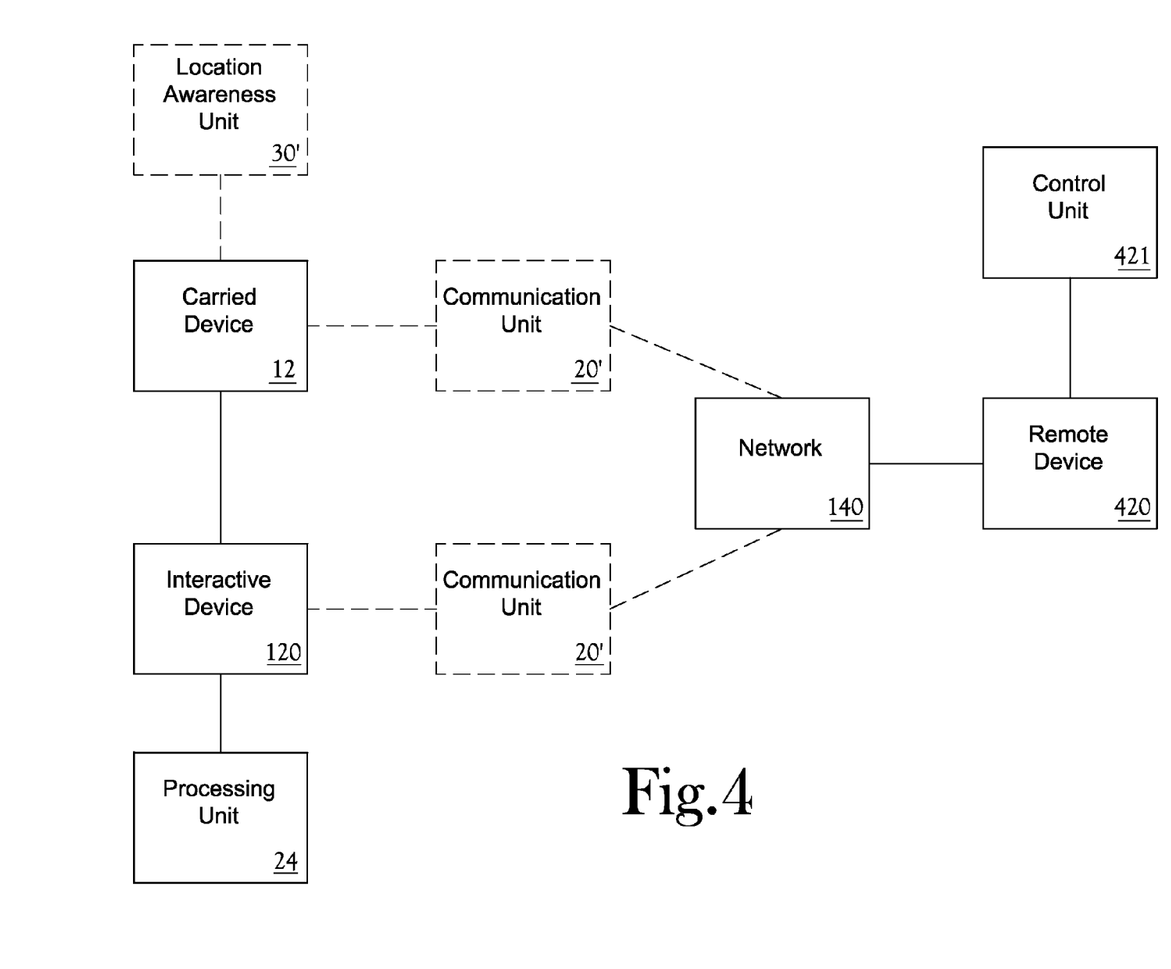
FIG. 4 is a block diagram illustrating another example embodiment of the animal data communication system according to the various features of the present general inventive concept.
Figure 5:
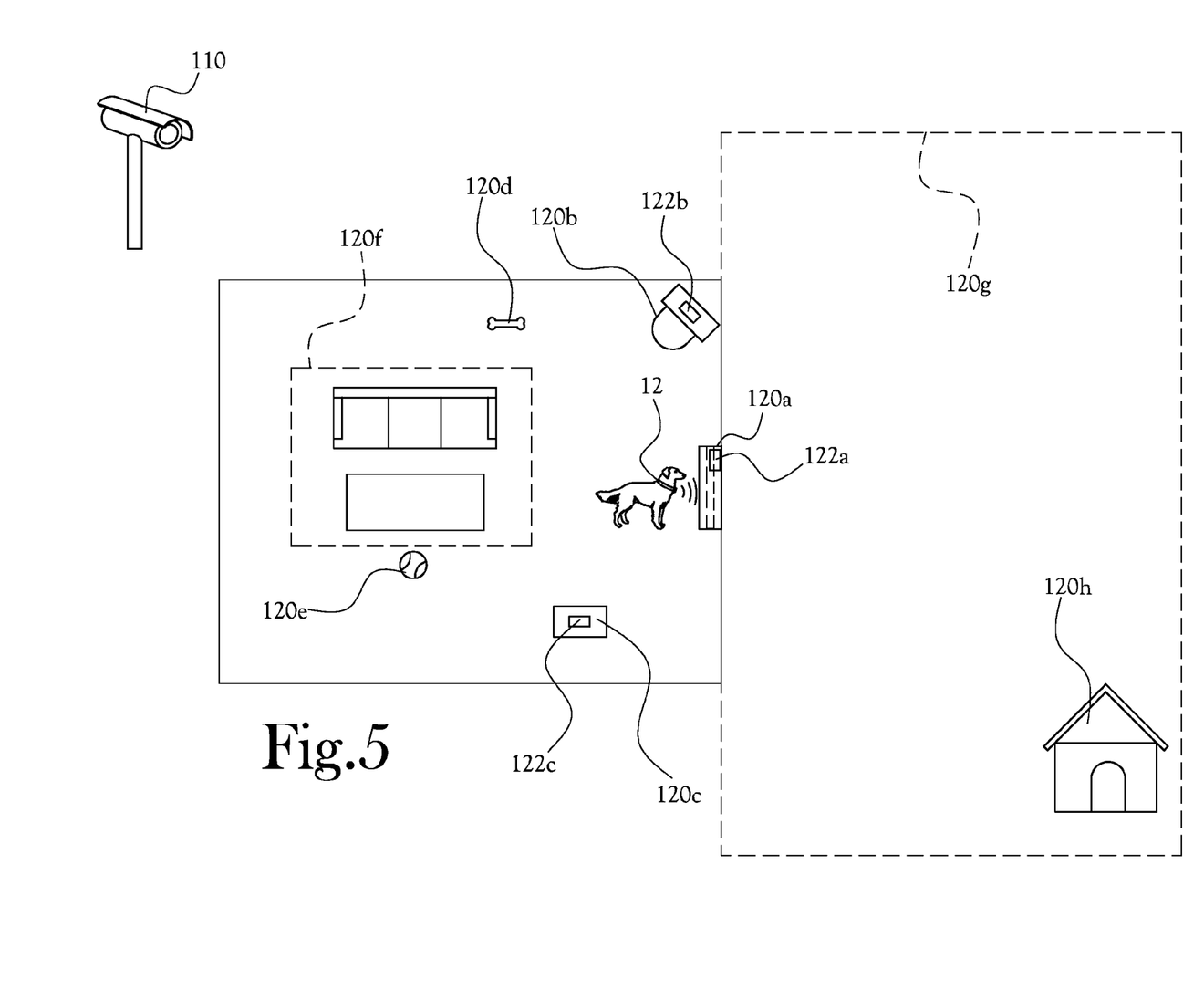
FIG. 5 is a perspective view of a system environment in which example embodiments of the present general inventive concept may be implemented.

FIG. 4 is a block diagram illustrating another example embodiment of the animal data communication system according to various features of the present general inventive concept, and FIG. 5 is a perspective view of a system environment in which example embodiments of the present general inventive concept may be implemented.

Referring to FIGS. 4 and 5, the animal data communication system includes a remote device 420 operable by a user to communicate with the network 140 and to access the animal data over the network. The interactive device 120 can include at least one detector (120*a,b,c*), a processing unit 24, and a communication unit 20' (e.g., transmitter 20) to collect, process and transmit the animal data over the network 140 to a remote device 420. The carried device 12 can also include these components, if desired.

The remote device 420 and the communication unit 20' can be configured to facilitate two-way communication between the communication unit and the remote device such that the communication unit transmits the animal data over the network only when requested to do so by the remote device. The communication unit 20' can also be configured to facilitate communication between one or more carried devices 12 and interactive accessory devices 120, although other forms of interaction between the carried devices 12 and interactive devices 120 can also be used, such as, but not limited to, magnetic coding, RFID tags/readers, photo detectors, proximity detectors, Bluetooth, WiFi, or other types of RF communication. In addition, the remote device 420 can include a control unit 421 to receive control signals from the user such that the remote device transmits the control signals over the network 140 to the communication unit 20' disposed on one or both of the accessory device 120 and carried device 12 to facilitate remote control of the respective devices. For example, the control signals can be sent over the network 140 to activate and/or deactivate a particular animal accessory device (e.g., pet door), based on the user's observation of the animal data.

FIG. 5 is a perspective view of a system environment in which example embodiments of the present general inventive concept may be implemented. As illustrated in FIG. 5, an example animal accessory device can include a boundary control unit 120*f*, 120*g* defining a boundary. The rover unit 12 can include a location awareness unit 30'. The location awareness unit 30' can include a processing unit to process the positional information relative to a respective boundary of the boundary control unit. Accordingly, the particular condition can be based on positional information of the animal generated by the location awareness unit 30', enabling the particular condition to occur, for example, if the animal reaches a particular location relative to a boundary control system.

As illustrated in FIG. 5, additional example animal accessory devices can include a pet door 120*a*, a pet feeding/watering device 120*b*, a litter box 120*c*, a pet consumable 120*d*, a pet toy 120*e*, a dog house 120*h*. The accessory device can also include a pet tracking device, such as camera unit 110 having a field of view to capture actions engaged in by the animal. The accessory devices can include respective detectors 122*a*, 122*b*, 122*c* with the carried device 12 and/or the animal to determine whether the animal has engaged in a particular action relative to the animal. For example, the carried device can include a magnet RFID, or other device that interacts with the pet door detector 122*a* to detect that the animal has engaged in action proximate the pet door 120*a*. The particular condition can include one or more times of day or night at which the animal is permitted to enter or exit the pet door. If a particular condition occurs, for example, if the animal is permitted to exit the pet door 120a at the particular time, the door will open permitting the animal to exit, and the communication unit will then transmit the associated animal data over the network to the remote user.

If the animal accessory device is a pet feeding device, the particular condition can include a measurement of an amount of food contained in the pet feeding device. If the animal accessory device is a pet watering device, the particular condition can include a measurement of an amount of water contained in the pet watering device.

It is noted that the animal data communication system can include a plurality of rover units respectively carried by a plurality of animals, and the processor can process the animal data according to the detected action of each animal. In addition, the animal data communication system can include a plurality of animal accessory devices, and the processor can process the animal data according to the detected action of the animal with respect to each animal accessory device. The detected action engaged in by a particular animal can be compiled to correspond to a particular animal accessory device, providing the user with a summary of behavior for one or more animals and one or more accessory devices.

From the foregoing description, those skilled in the art will recognize that a system for communicating information regarding an animal offering advantages over the prior art has been provided. The system provides an animal data collecting device for detecting and compiling information regarding the animal. Further, the system provides an interfacing device in communication with the animal data collecting device and a network such that the interfacing device receives the information from the animal data collecting device and transfers the information to the network, where the user of the system can access the information from a location remote to the animal.

While the present general inventive concept has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The general inventive concept in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. An animal data communication system, comprising:
a rover unit to be carried by an animal;
an animal accessory device to interact with the rover unit and/or animal;
at least one detector to detect an occurrence of an action engaged in by the animal, and to generate a signal indicative of a detected action;
a processing unit to generate animal data identifying the detected action based on the generated signal; and
a communication unit disposed on at least one of the rover unit and the animal accessory device to transmit the animal data over a network in response to an occurrence of one or more particular conditions associated with the detected action.

2. The animal data communication system of claim 1, further comprising a remote device operable by a user to communicate with the network and to access the animal data over the network.

3. The animal data communication system of claim 2, wherein the remote device and the communication unit are configured to facilitate two-way communication between the communication unit and the remote device such that the communication unit transmits the animal data over the network only when requested to do so by the remote device.

4. The animal data communication system of claim 2, wherein the remote device includes a control unit to receive control signals from the user, and to transmit the control signals over the network to control at least one of the rover unit and the animal accessory device.

5. The animal data communication system of claim 4, wherein the control signals include a signal to activate and/or deactivate the animal accessory device.

6. The animal data communication system of claim 1, wherein the detector is disposed on at least one of the rover unit and the animal accessory device, and the communication unit is disposed on the animal accessory device to transmit the animal data upon the occurrence of the particular condition.

7. The animal data communication system of claim 6, wherein the animal accessory device is a pet feeding device, and the particular condition includes a measurement of an amount of food contained in the pet feeding device.

8. The animal data communication system of claim 6, wherein the animal accessory device is a pet watering device, and the particular condition includes a measurement of an amount of water contained in the pet watering device.

9. The animal data communication system of claim 6, wherein the animal accessory device is a pet door, and the particular condition includes one or more times at which the animal is permitted to enter or exit the pet door.

10. The animal data communication system of claim 1, wherein the rover unit includes a location awareness unit, and the particular condition includes positional information of the animal.

11. The animal data communication system of claim 10, wherein the animal accessory device includes a boundary control unit, and the processing unit processes the positional information relative to a boundary of the boundary control unit.

12. The animal data communication system of claim 1, further comprising a plurality of rover units respectively carried by a plurality of animals, wherein the processor processes the animal data according to the detected action of each animal.

13. The animal data communication system of claim 1, further comprising a plurality of animal accessory devices, wherein the processor processes the animal data according to the detected action of the animal with respect to each animal accessory device.

14. The animal data communication system of claim 13, further comprising a plurality of rover units respectively carried by a plurality of animals, wherein the processor processes the animal data according to the detected action of each animal with respect to each animal accessory device.

15. The animal data communication system of claim 1, wherein the animal accessory device includes one or more of an animal boundary control unit, a pet feeding device, a pet watering device, a pet door, a litter box, a pet toy, a pet consumable, and an animal tracking system, and the detected action engaged in by the animal corresponds to a particular animal accessory device.

16. The animal data communication system of claim 1, wherein the at least one detector includes one or more of an animal bark sensor, a proximity detector, a fluid level detector, a weight detector, and a camera unit.

17. An animal data communication system, comprising:
a rover unit to be carried by an animal;
an animal accessory device to interact with the rover unit and/or animal;
at least one detector to detect a physiological condition of the animal and an action engaged in by the animal, and to generate signals indicative of a detected action and a detected physiological condition;
a processing unit to generate animal data identifying the detected action and the detected physiological condition based on the generated signals; and
a communication unit disposed on at least one of the rover unit and the animal accessory device to transmit the animal data over a network in response to an occurrence of one or more particular conditions associated with the detected action and/or the detected physiological condition.

18. The animal data communication system of claim 17, wherein the animal accessory device is a pet door, and the pet door is configured to enable the animal to enter or exit the pet door only upon the occurrence of a particular condition associated with the detected physiological condition of the animal.

19. The animal data communication system of claim 17, wherein the at least one detector includes one or more of an animal bark sensor, a proximity detector, a fluid level detector, a weight detector, a camera unit, and a thermocouple.

* * * * *